United States Patent
Hsu et al.

(10) Patent No.: US 12,504,108 B1
(45) Date of Patent: Dec. 23, 2025

(54) JOINT FLOATING FIXED SEAT STRUCTURE

(71) Applicant: FOSITEK CORPORATION, New Taipei (TW)

(72) Inventors: An-Szu Hsu, New Taipei (TW); Chun-Han Lin, New Taipei (TW); Yung-Chih Tseng, New Taipei (TW); Hao-Yun Lee, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 19/062,299

(22) Filed: Feb. 25, 2025

(30) Foreign Application Priority Data

Feb. 11, 2025 (TW) ................. 114105055

(51) Int. Cl.
*F16L 37/50* (2006.01)
*F16L 37/53* (2006.01)
*H05K 7/20* (2006.01)

(52) U.S. Cl.
CPC .......... *F16L 37/53* (2013.01); *H05K 7/20272* (2013.01); *H05K 7/20781* (2013.01)

(58) Field of Classification Search
CPC . F16L 37/22; F16L 37/50; F16L 27/00; F16L 27/08; H05K 7/20
See application file for complete search history.

(56) References Cited

U.S. PATENT DOCUMENTS

| | | | | |
|---|---|---|---|---|
| 2,837,352 A | * | 6/1958 | Wurzburger | F16L 37/22 285/349 |
| 3,508,580 A | * | 4/1970 | Snyder, Jr. | F16L 37/50 137/614.04 |
| 4,709,726 A | * | 12/1987 | Fitzgibbons | E21B 33/038 137/614.04 |
| 5,322,330 A | * | 6/1994 | Remsburg | F16L 37/56 285/39 |
| 10,288,198 B2 | * | 5/2019 | Tiberghien | H05K 7/20272 |
| 11,746,942 B2 | * | 9/2023 | Durieux | F16L 37/56 251/149.6 |
| 12,372,179 B1 | * | 7/2025 | Tseng | H05K 7/20272 |
| 12,404,959 B1 | * | 9/2025 | Hsu | F16L 37/52 |
| 12,422,079 B1 | * | 9/2025 | Hsu | F16L 37/34 |
| 2015/0148111 A1 | * | 5/2015 | Kim | H04Q 1/025 455/575.8 |
| 2016/0010772 A1 | * | 1/2016 | Tiberghien | F28F 3/12 285/24 |
| 2022/0349503 A1 | * | 11/2022 | Durieux | F16L 37/02 |
| 2022/0412496 A1 | * | 12/2022 | Nick | F16L 37/52 |

(Continued)

*Primary Examiner* — Aaron M Dunwoody
(74) *Attorney, Agent, or Firm* — Demian K. Jackson; Jackson IPG PLLC

(57) ABSTRACT

A joint floating fixed seat structure includes a fixed seat, an adapter, a guiding sliding set, an abutting gasket and a spring. A receiving space is disposed inside the fixed seat, and the adapter penetrates the receiving space. The guiding sliding set is movably accommodated in the receiving space and sleeved on the adapter, which includes a sliding element that can move left and right and a guiding seat that can move up and down along the sliding element. The abutting gasket is sleeved on the adapter, the spring is located between the guiding sliding set and the abutting gasket and abuts against the abutting gasket and against the adapter by the abutting gasket to eliminate the influence of pre-pressure of the spring.

10 Claims, 6 Drawing Sheets

(56) References Cited

U.S. PATENT DOCUMENTS

| | | | |
|---|---|---|---|
| 2023/0136128 A1* | 5/2023 | Chang ................... | F16L 37/50 |
| | | | 137/614.05 |
| 2023/0143344 A1* | 5/2023 | Marquis ................ | F16L 37/52 |
| | | | 285/261 |
| 2023/0184363 A1* | 6/2023 | Marquis ................ | F16L 37/30 |
| | | | 285/261 |
| 2024/0077160 A1* | 3/2024 | Zhang ................... | F16L 37/56 |
| 2025/0198556 A1* | 6/2025 | Marques Barroca ... | F16L 37/50 |

* cited by examiner

JOINT FLOATING FIXED SEAT STRUCTURE

This application claims the priority benefit of Taiwan patent application number 114105055 filed on Feb. 11, 2025, the disclosure of which is hereby incorporated by reference in its entirety.

FIELD OF THE INVENTION

The present invention relates to a joint floating fixed seat, and more particularly to a joint floating fixed seat structure for reducing radial sliding resistance in a water cooling system.

BACKGROUND OF THE INVENTION

As the computing performance of servers increases, the heat generated by the computing units therein also increases. Multiple servers are installed in a server cabinet simultaneously and the space between each server is very narrow so that it is no longer possible to set up additional heat dissipation modules to dissipate heat for each server one by one. The heat dissipation modules that use traditional air cooling methods can no longer meet the heat generated by servers nowadays, and heat accumulation is easily generated inside because of the narrow space between servers. Therefore, the industry uses water cooling to dissipate heat in each server in the server cabinet. Since the server contains sophisticated electronic components, various water cooling pipes are configured mainly to avoid water leakage at each joint to prevent electronic components from being damaged by water leakage. In order to prevent water leakage, hard or metal pipes are applied to most server pipes for configuration of cooling water pipes. Moreover, most of the circulation pipelines are configured on the server cabinets, and since each server and the server cabinet are assembled in a horizontal pulling manner like a drawer, a male and a female quick joint are correspondingly disposed on the server and the server cabinet. Since a small radial tolerance will be generated when the water cooling pipelines are assembled on the server and the server cabinet, and at least one guiding post is arranged beside a location where the quick joint is arranged on the server cabinet in order to facilitate the rapid correction of the small radial tolerance of the two quick joints, and a guiding seat is arranged beside of a location where the quick joint is arranged on the server corresponding to the position of the guiding post, and the guiding seat has a guiding hole. When the two quick joints are assembled, the guiding post is first inserted into the guiding hole of the guiding seat, and the two quick joints with slight eccentricity are first guided to be close to the coaxial center and then smoothly docked.

However, conventional water-cooling joints are all of a fixed type. When the eccentricity of the two quick joints is too large, the guiding post and the guiding seat can be used for guiding connection. Therefore, some industries have provided a kind of floating fixed seat of joint with radial displacement which can be used for tolerance compensation of two non-coaxial joints, so as to correct the radial deviation of two quick joints with excessive radial tolerance and to compensate the radial deviation between the two joints. However, the conventional joint floating fixed seat has a relatively large resistance when sliding radially, which affects the mutual connection between the two joints.

The conventional joint floating fixed seat has a relatively large resistance when sliding radially for the following reasons. This is mainly because the structure of the conventional joint floating fixed seat has too large a spring force and the position of the sliding element is not convenient for radial sliding. In addition, the lever arm from the sliding element to the opening of the guiding hole of the guiding seat is longer and the torque generated is larger, which will cause a larger radial sliding resistance when the two joints are connected. Furthermore, the radial sliding resistance of the conventional joint floating fixed seat is affected by the axial force, which may cause a relatively unstable state.

Furthermore, the conventional joint floating fixed seat easily causes the sliding element of the joint floating fixed seat to fall off when the two joints are connected, and results in the various deficiencies, which the inventor of the application and related practitioners engaged in this industry are eager to study and improve.

SUMMARY OF THE INVENTION

Therefore, in order to effectively solve the above-mentioned problems, one purpose of the present invention is to improve the conventional joint floating fixed seat, which has a large resistance when sliding radially, and the radial sliding resistance of the joint floating fixed seat is affected by the axial force, which will cause a relatively unstable state.

Another object of the present invention is to improve the problem that the sliding element of the conventional joint floating fixed seat easily falls when two joints are connected.

To achieve the above-mentioned purpose, the present invention discloses a joint floating fixed seat structure, which at least includes: a fixed seat, an adapter, a guiding sliding set, an abutting gasket and a spring.

The fixed seat has a receiving space internally and two ends respectively provided with an open end and a closed end, the receiving space is located between the open end and the closed end, the closed end is provided with a through hole, the open end is provided with an opening, and the opening is connected to the through hole through the receiving space.

The adapter has a joint section, a sleeve section and a buffer section connecting the sleeve section and the joint section, the sleeve section extends through the opening and the receiving space and protrudes out of the through hole, the buffer section is located in the receiving space, and the joint section is located outside the opening.

The guiding sliding set is movably accommodated in the receiving space of the fixed seat and sleeved on the buffer section, and the guiding sliding set includes: a sliding element slidably disposed in the receiving space and provided with a sliding slot hole for the buffer section to pass through, the sliding element having a sliding slot passage positioned correspondingly to the opening of the open end of the fixed seat; and a guiding seat passing through the opening and slidably disposed in the sliding slot passage and sleeved on the buffer section, allowing the adapter to move up and down along the sliding slot passage.

The abutting gasket is sleeved on the buffer section and accommodated in the receiving space, the abutting gasket is located between the guiding sliding set and the closed end.

The spring is sleeved on the buffer section and accommodated in the receiving space, the spring is located between the guiding sliding set and the abutting gasket.

Thus, the joint floating fixed seat structure of the present invention improves the problem that the conventional joint floating fixed seat has a large resistance when sliding radially, and the radial sliding resistance of the fixed seat is affected by the axial force, which may cause a relatively unstable state, and the risk that the conventional floating fixed seat of the joint may fall off when the male and female joints are connected is avoided. In addition, the joint floating fixed seat structure of the present invention can also control the radial sliding resistance of the adapter to provide the desired feel for the user, and sliding along the radial direction is more complete, the space or structure limitation during docking is reduced, and the joint is guided to the joint location more flexibly. Moreover, the radial sliding resistance of the adapter is less affected by the spring pre-pressure. The spring also provides a compression stroke so that the adapter can tolerate axial tolerances while allowing the joint to tilt slightly.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

Figure 1:
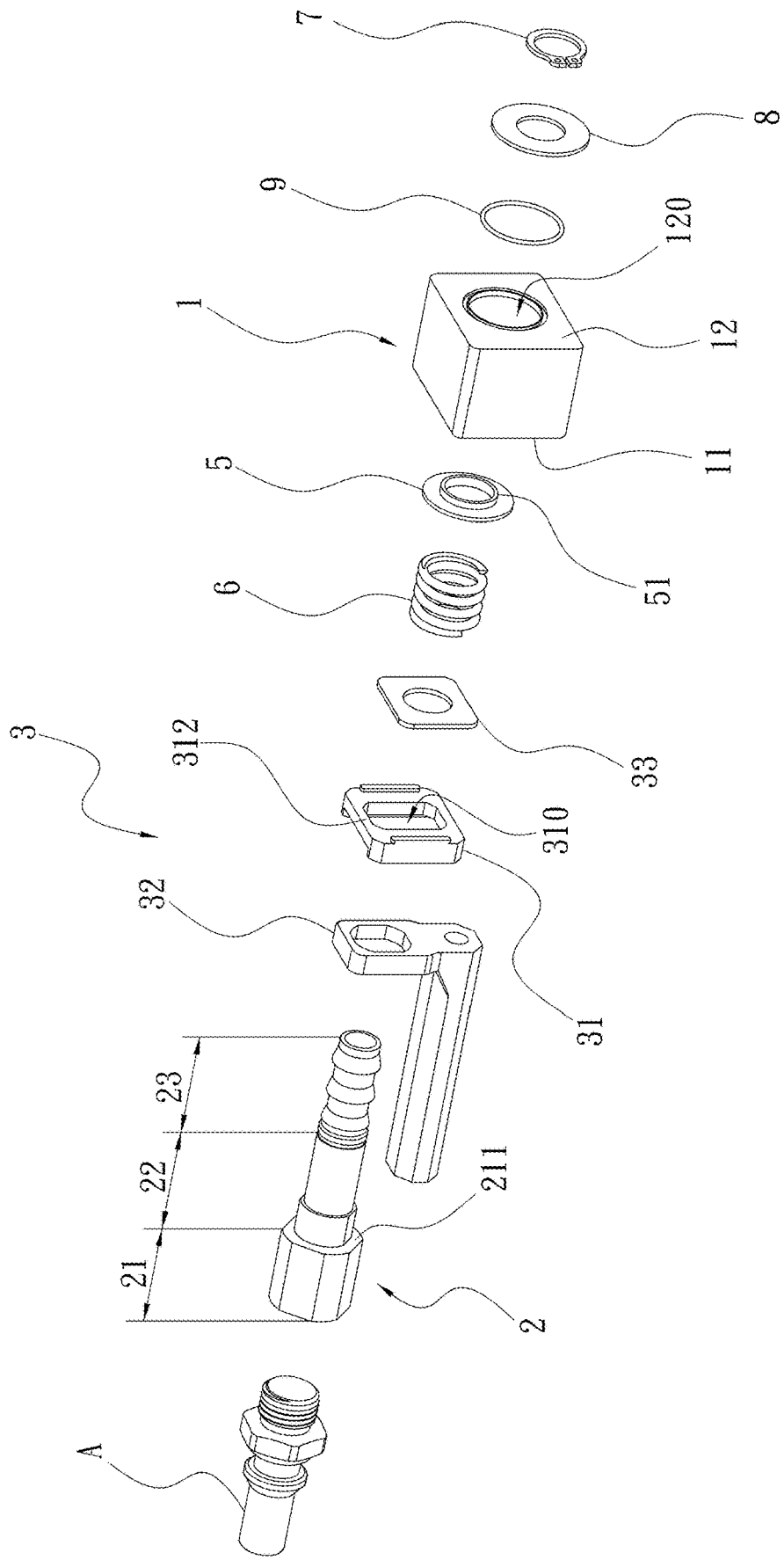
FIG. 1 is a perspective exploded schematic diagram of a joint floating fixed seat structure according to the present invention.

The present invention will now be described with a preferred embodiment thereof.

Please refer to FIGS. 1 to 5 of the present invention, a joint floating fixed seat structure of the present invention at least includes a fixed seat 1, an adapter 2, a guiding sliding set 3, an abutting gasket 5, a spring 6, a fixed element 7, a sliding gasket 8 and an elastic element 9.

Figure 2:
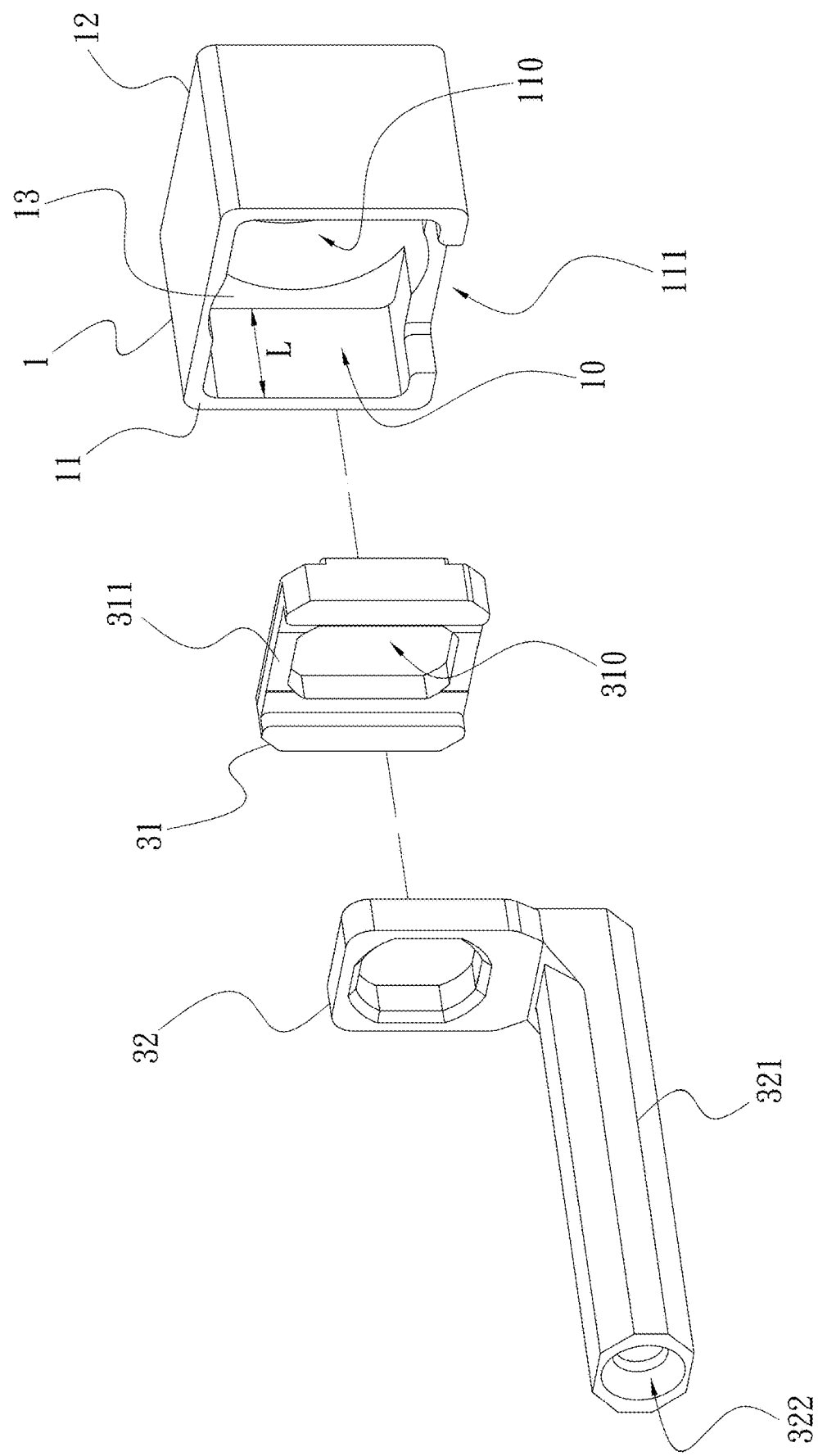
FIG. 2 is a partially exploded perspective view of a joint floating fixed seat structure according to the present invention.
Figure 4:
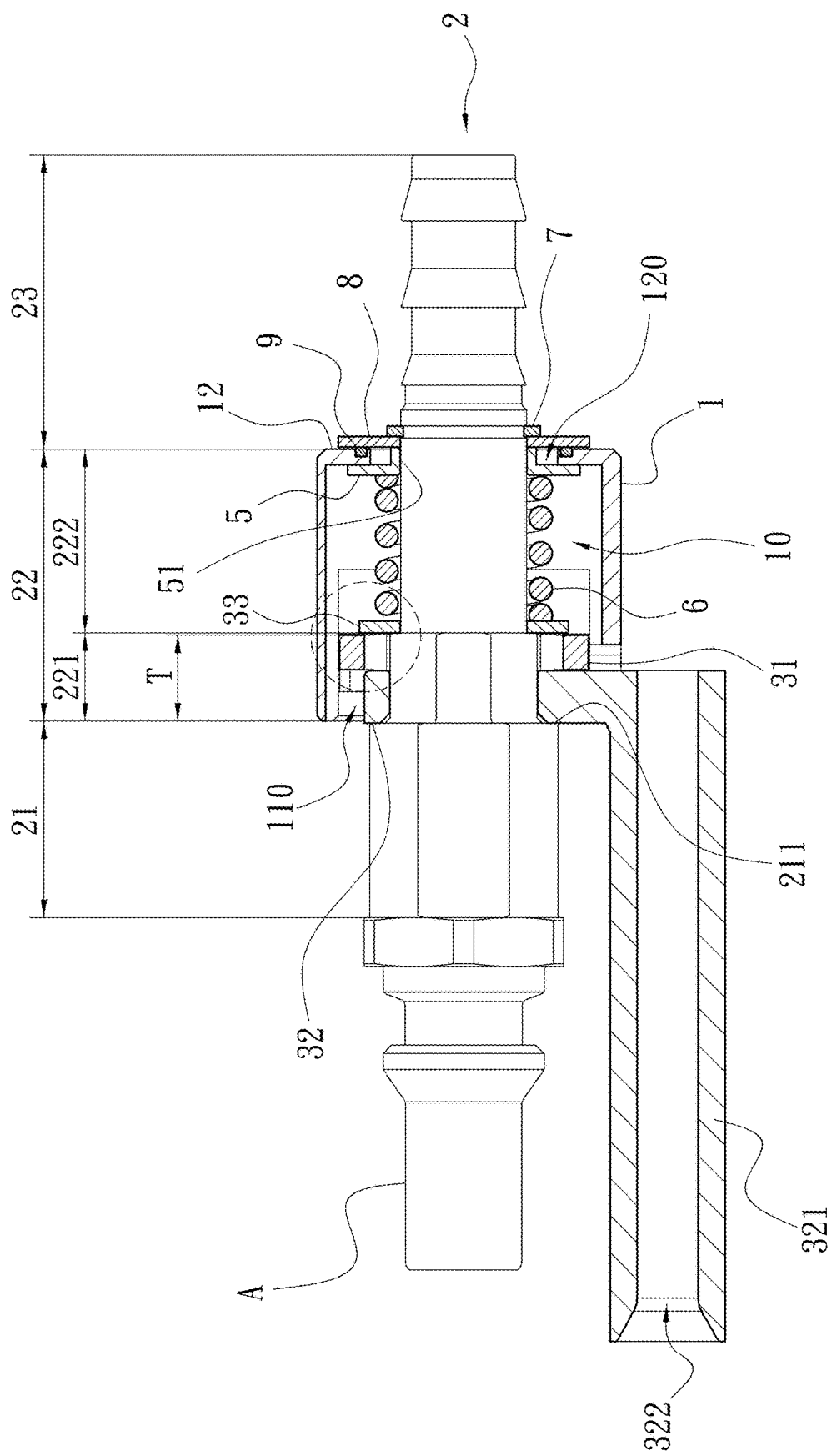
FIG. 4 is a cross-sectional schematic diagram of a joint floating fixed seat structure of the present invention.
Figure 5:
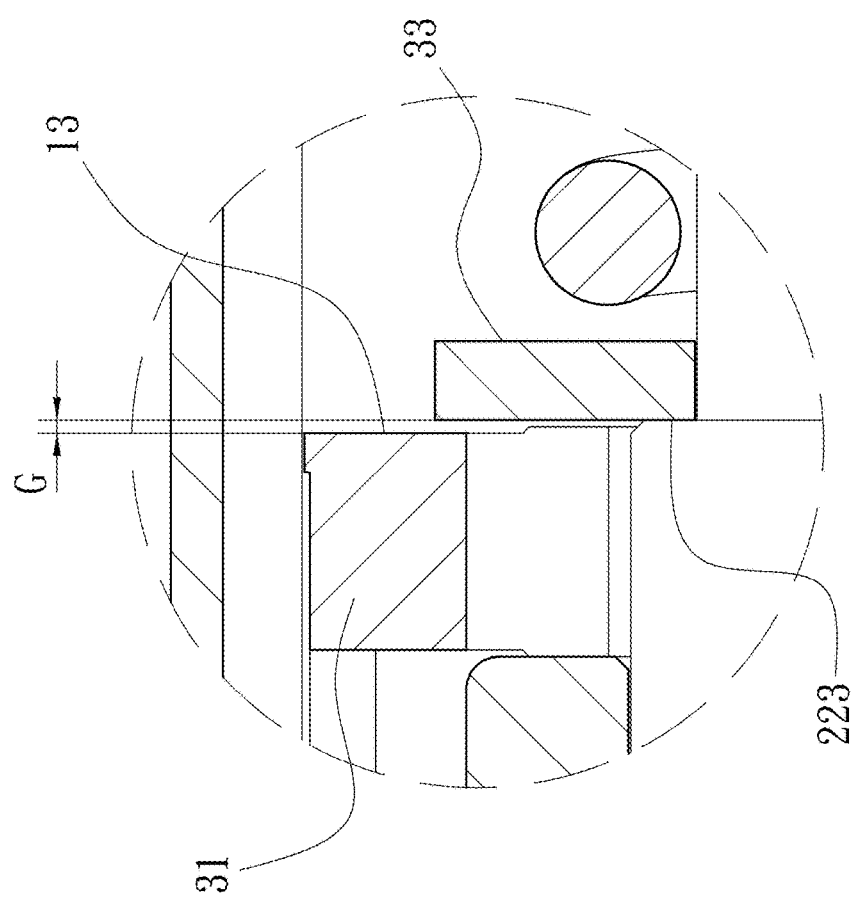
FIG. 5 is an enlarged schematic diagram of the structure of the dotted circle portion of FIG. 4.

As shown in FIGS. 1, 2 and 4, the interior of the fixed seat 1 internally has a receiving space 10, and two ends thereof are respectively provided with an open end 11 and a closed end 12, the receiving space 10 is located between the open end 11 and the closed end 12, the closed end 12 is provided with a through hole 120, the open end 11 has an opening 110, and the opening 110, the receiving space 10 and the through hole 120 are connected.

Figure 3:
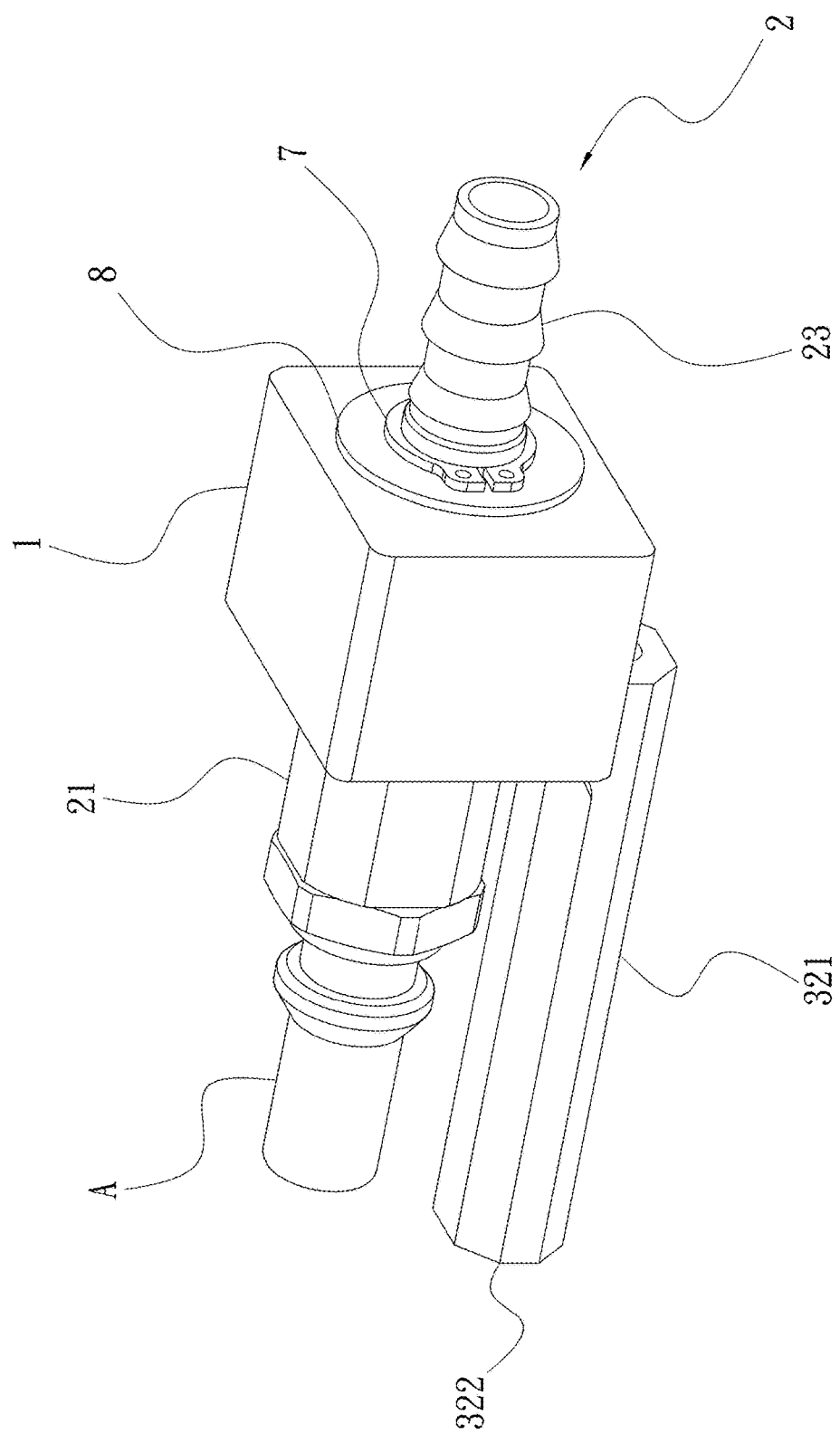
FIG. 3 is a three-dimensional schematic diagram of the joint floating fixed seat structure of according to the present invention.

Please refer to FIG. 1, FIG. 3 and FIG. 4, the two ends of the adapter 2 respectively have a sleeve section 23 and a joint section 21, and the sleeve section 23 and the joint section 21 are connected via a buffer section 22. The sleeve section 23 passes through the opening 110 and the receiving space 13 of the fixed seat 1 and extends out of the through hole 120, the buffer section 22 is located in the receiving space 10 of the fixed seat 1, the joint section 21 is located outside the opening 110 of the fixed seat 1. In some embodiments, the adapter 2 may internally have a tube channel to allow stable transmission of fluid, and be connected to the male connector A through methods such as threaded locking, or the joint section 21 may extend another structure to be coupled with other components, or the adapter 2 and the male connector A may be integrally formed, but the present application is not limited to this.

As shown in FIGS. 1 to 2 and 6 to 7, the guiding sliding set 3 can be movably accommodated in the receiving space 10 in a cross-moving manner relative to the fixed seat 1 and sleeved on the buffer section 22. The guiding sliding set 3 includes: a sliding element 31, which is slidably disposed in the receiving space 10 and is provided with a sliding slot 310 for the buffer section 22 to pass through, the sliding element 31 is provided with a sliding channel 311 corresponding to the opening 110 of the open end 11 of the fixed seat 1, and the sliding element 31 is provided with an internal gasket sliding slot 312 corresponding to the closed end 12 of the fixed seat 1; a guiding seat 32 passing through the opening 110 and slidably arranged in the sliding channel 311 and sleeving the buffer section 22, so that the adapter 2 can move up and down, axially or vertically along the sliding channel 311; and an internal gasket 33, which is sleeved on the buffer section 22 and accommodated in the receiving space 10, and the internal gasket 33 slidably arranged in the internal gasket sliding slot 312.

Specifically, in the embodiment, the sliding element 31 is accommodated in the receiving space 10 so as to slide left and right or slide (move) horizontally, and has a sliding slot 310 therethrough to allow the buffer section 22 to pass through, and to allow the adapter 2 to slide radially. For example, the sliding element 31 may be a block having a hollow shape, but the shape of the sliding element 31 is not limited to a cube, a circle, an ellipsoid or a polygon. In addition, in the embodiment, the sliding slot 310 is in the shape of a long hole extending up and down to allow the buffer section 22 to move up and down or vertically in the sliding slot 310, so that the adapter 2 and the fixed seat 1 can move relative to each other in the radial direction. Furthermore, the sliding slot hole 310 is axially connected to the sliding channel 311, and the radial length of the sliding slot hole 310 is smaller than the length of the sliding channel 311.

In the embodiment, the adapter 2 inserted into the sliding element 31 can slide left and right in the fixed seat 1 together with the sliding element 31.

Furthermore, the adapter 2 can also slide up and down in the sliding slot 310 without interference. For example, the sliding slot 310 extends longitudinally and thus retains space for the adapter 2 to slide up and down. Therefore, although the sliding element 31 is limited by the fixed seat 1 above and below, the adapter 2 can still slide up and down in the sliding slot 310 thereof. The guiding seat 32 can be slidably disposed in the sliding slot 311 and sleeved on the buffer section 22, so that the adapter 2 can move up and down along the sliding slot 311. In this way, the guiding sliding set 3 can be movably accommodated in the receiving space 10 in a cross-moving manner relative to the fixed seat 1, and simultaneously drive the adapter base 2 to move leftward, rightward, upward, and downward in a cross-shaped manner.

In addition, the internal gasket sliding slot 312 and the sliding slot 311 are respectively provided on the front and rear sides of the sliding element 31 to slide the internal gasket 33 and the guiding seat 32 respectively so as to slide up and down along the internal gasket sliding slot 312 and the sliding slot 311 respectively. In addition, the internal gasket 33 and the guiding seat 32 are respectively sleeved on the buffer section 22 of the adapter 2. The internal gasket 33 and the guiding seat 32 are tightly or closely sleeved on the buffer section 22 of the adapter 2 (that is, without relative radial sliding), thus the buffer section 22, the internal gasket 33 and the guiding seat 32 move together, allowing the adapter 2 to be slidably disposed up and down in the sliding slot 310.

Figure 7:
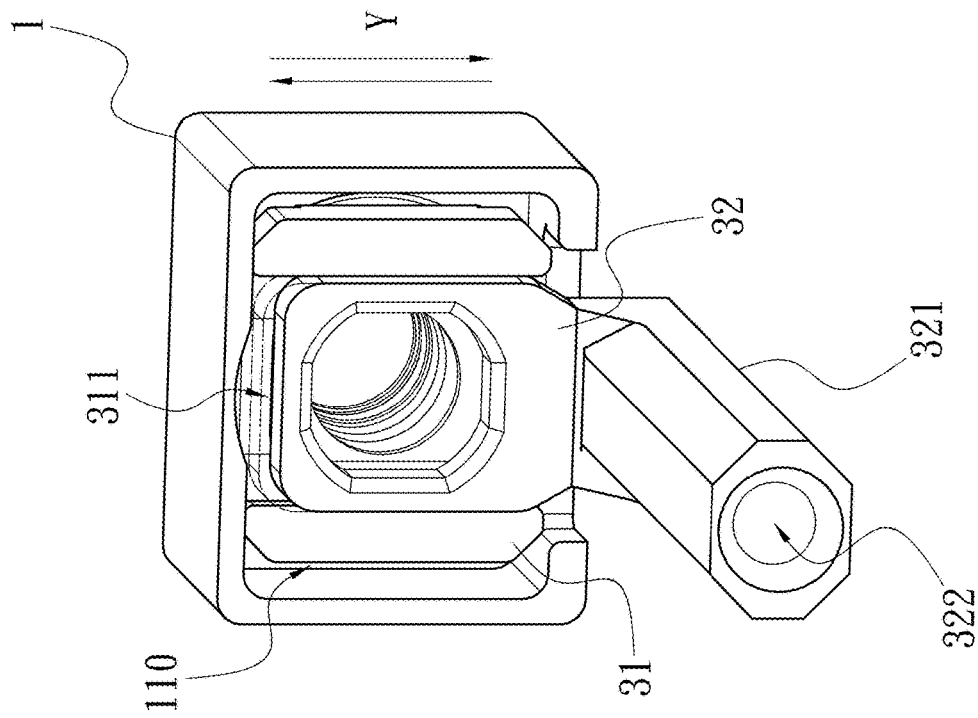
FIG. 7 is a schematic diagram of the operation of the floating fixed seat structure of the joint of the present invention.
Figure 6:
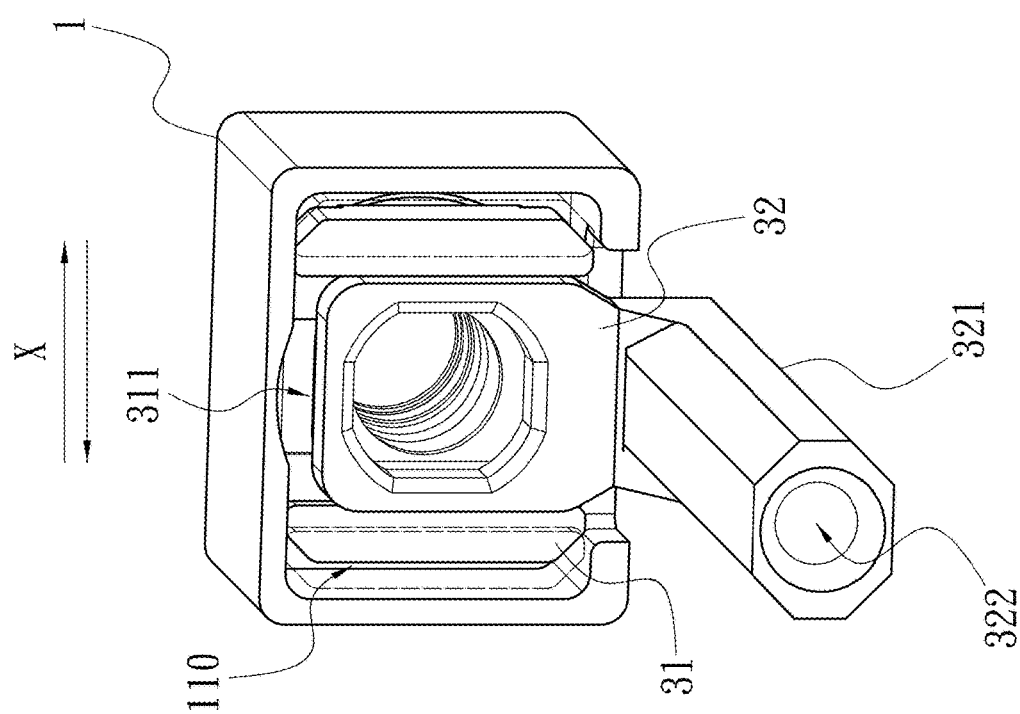
FIG. 6 is a schematic diagram of the operation of the joint floating fixed seat structure of the present invention.

In summary, referring to FIGS. 4, 6 and 7, the sliding element 31 and the adapter 2 can slide left and right together relative to the receiving space 10 in the fixed seat 1, and the adapter 2 can also slide up and down together with the internal gasket 33 and the guiding seat 32 relative to the sliding element 31. Thus, the present invention can make the adapter 2 slide freely in the radial direction relative to the fixed seat 1 (i.e., up, down, left, and right). Meanwhile, the adapter 2 can be fixed in the fixed seat 1 and is not easy to be separated, so as to achieve structural stability and improve reliability.

Meanwhile, as shown in FIG. 4, the internal gasket 33 is sleeved on the buffer section 22 and accommodated in the receiving space 10, and the internal gasket 33 is located between the guiding sliding set 3 and the closed end 12. More specifically, the internal gasket 33 is located between the sliding element 31 and the closed end 12. The abutting gasket 5 is sleeved on the buffer section 22 of the adapter 2 and accommodated in the receiving space 10, and the abutting gasket 5 is located between the internal gasket 33 and the closed end 12, and is located in the receiving space 10 of the fixed seat 1 close to the through hole 120, adjacent to the closed end 12 of the fixed seat 1. Correspondingly, the sliding gasket 8 is sleeved on the sleeve section 23 of the adapter 2, disposed on the fixed seat 1 and adjacent to the outside of the closed end 12 of the fixed seat 1, and located between the fixing element 7 and the closed end 12.

Specifically, the abutting gasket 5 abuts against the internal wall surface of the closed end 12 of the fixed seat 1, and the abutting gasket 5 has a protrusion 51 on the side facing the through hole 120. The protrusion 51 extends through the through hole 120. For example, the protrusion 51 may be a ring-shaped tubular structure with a fixed diameter, so that the sliding gasket 8 can be directly abutted and supported by the protrusion 51 of the abutting gasket 5. In some embodiments, the abutting gasket 5 and the protrusion 51 thereof may be integrally or non-integrally formed, but the present invention is not limited thereto.

In the embodiment, the sleeve section 23 of the adapter 2 extends to the outside of the through hole 120 of the fixed seat 1 and can provide structural support for components (such as coolant delivery pipes or sealing components, not shown). Furthermore, a slot is usually provided on the outer periphery of the sleeve section 23 for fixing components such as the sliding gasket 8 to avoid being separated from the through hole 120 and thus produce axial limitation to prevent the adapter 2 from being shifted and separated from the fixed seat 1.

The protrusion 51 extends axially through the through hole 120 and directly contacts the sliding gasket 8, so that the external force can be directly transmitted to the sliding gasket 8 to avoid the force acting on the internal periphery of the through hole 120. The force from the sliding gasket 8 is then tolerated by the axially limited sliding gasket 8 itself (or an additional fixing element 7). Thereby, when the abutting gasket 5 is pushed, the force will not act between the abutting gasket 5 and the fixed seat 1, thereby effectively reducing the friction resistance of the contact surface. Therefore, the present invention can achieve the effect of preventing the displacement of the adapter 2 from being affected by force, thereby preventing the adapter 2 from being affected by external force and increasing sliding resistance, thereby ensuring that it can still slide radially freely under force. Furthermore, through the cooperation between the abutting gasket 5 and the sliding gasket 8, the adapter 2 passes through and cooperates with the fixed seat 1 to be stably fixed, while resistance is effectively reduced.

At this time, as shown in FIG. 4, the joint section 21 of the adapter 2 is located at the other end opposite to the sleeve section 23, and the joint section 21 is also outside the receiving space 10 of the fixed seat 1. Specifically, the internal circumference of the pipe passage near the end face of the joint section 21 may be provided with a thread or a buckle structure for locking, so as to connect the male connector A. When the joints are connected, as shown in FIG. 3 and FIG. 4, the force applied to the male joint A during the connection can be directly guided to the joint section 21 to promote the radial sliding of the adapter 2.

In the embodiment, as shown in FIG. 4, the guiding seat 32 may also be branched in an L shape to connect a guiding block 321 extending from its lower portion and extending parallel to the axial direction of the adapter 2. The guiding block 321 has a guiding hole 322 that can correspond to a guiding post (not shown) for insertion. The guiding post is inserted into the guiding hole 322 to guide the movement of the adapter 2. When docking, the guiding seat 32 can use the guiding block 321 to correspond to the guiding post (not shown) being inserted to guiding the movement of the adapter 2 in the radial direction to correct the tolerance for smoothly docking. It is understandable that a lower notch 111 is provided at the open end 11 of the fixed seat 1 so as to allow the guiding block 321 to move up and down smoothly. As shown in FIG. 2, the lower notch 111 is connected to the opening 110 and the receiving space 10, and the guiding block 321 can extend and protrude outside the fixed seat 1 through the lower notch 111.

In addition, in the present embodiment, the buffer section 22 includes an outer buffer section 221 adjacent to the opening 110 and an internal buffer section 222 distant from the opening 110. The internal gasket 33, the abutting gasket 5 and the spring 6 are arranged on the internal buffer section 222. The guiding sliding set 3 is arranged on the outer buffer section 221, and a gap G is formed between the sliding element 31 and the internal gasket 33. It is understandable that the outer diameter of the outer buffer section 221 is greater than the outer diameter of the internal buffer section 222, so that a differential surface 223 is formed between the outer buffer section 221 and the internal buffer section 222, and the differential surface 223 can limit the internal gasket 33 on the internal buffer section 222. In addition, the fixed seat 1 is provided with a sliding surface 13 in the receiving space 10, and the sliding element 31 slides on the sliding surface 13, and the sliding surface 13 and the step surface 223 are not located on the same plane. In this way, the sliding element 31 and the internal gasket 33 will not contact each other due to the gap G, thus the problem of large resistance when the conventional joint slides is effectively solved, the operation is made more stable, convenient and labor-saving. It is understandable that the length L of the sliding surface 13 from the opening 110 is greater than or equal to the thickness T of the guiding sliding set 3, so as to ensure that the guiding sliding set 3 moves in the receiving space 10 and can be completely protected by the fixed seat 1 to prevent the guiding sliding set 3 from falling off.

In the embodiment, the buffer section 22 is the connecting portion between the joint section 21 and the sleeve section 23, and its outer diameter is slightly smaller than that of the joint section 21. The buffer section 22 is inserted into the sliding slot 310 of the sliding element 31 in the configured state to perform various radial sliding movements relative to the fixed seat 1 (e.g., up, down, left, and right). Furthermore, the difference in outer diameter between the buffer section 22 and the joint section 21 forms a limiting portion 211. The limiting portion 211 is an annular planar structure, surrounding the junction between the adapter seat 2 and the engaging section 21 and contacting the guiding seat 32.

The limiting portion 211 together with the guide seat 32 are stopped by the fixed seat 1, which can prevent the joint section 21 from excessively moving into the fixed seat 1 in the axial direction, thereby improving the stability of the overall structure. Furthermore, the limiting portion 211 can effectively disperse the external force applied to the adapter 2 and ensure that the relative position between the adapter 2 and the fixed seat 1 remains accurate.

In addition, the fixing element 7 can be sleeved on the outer periphery of the sleeve section 23 of the adapter 2 to axially limit the sleeve section 23, and the fixing element 7 abuts against the sliding gasket 8. In the embodiment, the fixing element 7 can be a buckle ring (e.g., a C-shaped buckle ring) or a nut with a ring-shaped interior and a thread for locking. The sleeve section 23 may also form a corresponding slot at the location where the buckle ring is fixed, so as to be suitable for fastening the buckle ring at a predetermined position (e.g., at the slot) so that no undesired relative axial movement occurs between the elements of the joint floating fixed seat structure. As long as the axial limiting can be effective, the present invention is not limited thereto.

The spring 6 is sleeved on the buffer section 22 of the adapter 2 and accommodated in the receiving space 10, which two ends respectively abut against the internal gasket 33 and the abutting gasket 5, and provide a certain pre-pressure toward the two ends to support the radial position of the adapter 2 floating in the fixed seat 1, and also buffer force during docking. Meanwhile, the compression stroke of the spring 6 can adapt to the tolerance change in the axial direction, allowing the adapter 2 to tolerate a certain range of dimensional errors during operation. In addition, the flexible design of the spring 6 enables it to support slight tilt adjustments of the adapter 2, which further improves the dynamic adaptability and operational stability of the structure. Furthermore, the internal gasket 33 and the abutting gasket 5 are respectively abutted against the adapter 2 to eliminate the influence of the preload of the spring 6 on the fixed seat 1.

When the joint is connected, the spring 6, the internal gasket 33, and the abutting gasket 5 are all sleeved on the buffer section 22 and abut against the internal gasket 33 and the abutting gasket 5, thus the pre-pressure of the spring 6 can be dispersed and evenly applied to the buffer section 22 by the internal gasket 33 and the abutting gasket 5, so that the spring 6 can smoothly slide up and down and left and right together with the adapter 2 and the guiding sliding set 3 without excessive resistance. At this time, the internal gasket 33 and the abutting gasket 5 can ensure that the pre-pressure of the spring 6 will not be directly applied on the guiding sliding set 3 to cause excessive resistance and sliding failure, or cause the uneven pre-pressure of the spring 6 to rub the sliding element 31 and the sliding element 31 or the spring 6 to be damaged.

On the other hand, in the direction toward one end of the through hole 120, the pre-pressure of the spring 6 is transmitted to the abutting gasket 5 and then transmitted to the sliding gasket 8 through the protrusion 51, so that the pre-pressure will not be transmitted to the fixed seat 1, but is instead transmitted to the sliding gasket 8 axially fixed on the adapter 2. Thereby, the minimum radial force that needs to be overcome to start radial sliding is greatly reduced, so that even when it is inconvenient to assemble in a convenient posture, the adapter 2 can still effectively trigger radial sliding by the receiving force, so as to immediately correct the axial eccentricity tolerance and smoothly bring the joint into the docking position.

Therefore, by using the internal gasket 33 and the abutting gasket 5 located on the adapter 2, the present invention can eliminate the influence of the pre-pressure of the spring 6 on the fixed seat 1 and greatly reduce the resistance to radial sliding. In addition, the spring 6 provides a pre-pressure within a certain compression range to allow the adapter 2 to tolerate axial tolerances, while flexibly allowing the male connector A to tilt slightly, but the present invention is not limited thereto.

Meanwhile, the present invention may also have an elastic element 9 sleeved on the sleeve section 23, which is arranged between the external surface of the closed end 12 of the fixed base 1 and the sliding gasket 8, and is adjacent to the sleeve section 23 of the adapter 2. It can be an element made of a material with elastic properties, such as: O-ring, elastic gasket, rubber ring, etc. The sliding gasket 8 compresses the elastic element 9 to generate a positive force, which can provide an elastic force to help the adapter 2 to slide and temporarily suspend at any position in the radial space at any time. In some embodiments, the pre-pressure of the spring 6 of the present invention is guided to the sliding gasket 8 by the protrusion 51. At this time, the source of the radial sliding resistance of the adapter 2 can be coordinated with the elastic element 9 to provide more precise adjustment. The amplitude of the radial sliding resistance provided can be controlled by the compression amount of the elastic element 9 or the selection of the material.

Thus, the floating fixed seat structure of the joint of the present invention improves the problem that the floating fixed seat of the conventional joint has a large resistance during radial sliding, and the sliding of the conventional fixed seat is affected by the resistance, which will cause the structure and docking to be unstable. It also prevents the sliding element of the conventional fixed seat from falling off when the joint is connected.

Referring to FIGS. 6 and 7, the fixed seat 1 of the present invention serves as a fixing portion for fixing the integral element. When a displacement adjustment is required in the radial direction relative to the adapter 2, the sliding element 31 and the guiding seat 32 in the guiding sliding set 3 can cooperate with the displacement adjustment path in both directions (the horizontal axis X and the vertical axis Y). As shown in FIG. 6, the fixed seat 1 provides a displacement adjustment of the sliding element 31 in the X direction. As shown in FIG. 7, the guiding seat 32 provides a displacement adjustment of the adapter 2 in the Y direction. The displacement adjustment provided by the guiding sliding set 3 can prevent the adapter 2 from tilting in the axial direction.

In summary, the present invention not only allows the adapter 2 to slide radially smoothly through the guiding sliding set 3, but also has flexibility and can be stably fixed in the fixed seat 1, and the cooperation of the abutting gasket 5, the spring 6 and the sliding gasket 8 is combined to disperse or disperse the pre-pressure of the spring 6 supported therebetween, thereby eliminating the risk of failure of the radial sliding function due to excessive resistance.

Thus, the present invention can effectively adjust the docking position, thereby effectively provide the user with a stable hand feeling.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A joint floating fixed seat structure, comprising:
   a fixed seat having a receiving space internally and two ends respectively provided with an open end and a closed end, the receiving space located between the open end and the closed end, the closed end being provided with a through hole, the open end being provided with an opening, and the opening being connected to the through hole through the receiving space;
   an adapter having a joint section, a sleeve section and a buffer section connecting the sleeve section and the joint section, the sleeve section extending through the opening and the receiving space and protruding out of the through hole, the buffer section located in the receiving space, and the joint section located outside the opening;
   a guiding sliding set movably accommodated in the receiving space of the fixed seat and sleeved on the buffer section, and the guiding sliding set including:
      a sliding element slidably disposed in the receiving space and provided with a sliding slot hole for the buffer section to pass through, the sliding element having a sliding slot passage positioned correspondingly to the opening of the open end of the fixed seat; and
      a guiding seat passing through the opening and slidably disposed in the sliding slot passage and sleeved on the buffer section, allowing the adapter to move up and down along the sliding slot passage;
   an abutting gasket sleeved on the buffer section and accommodated in the receiving space, the abutting gasket located between the guiding sliding set and the closed end; and
   a spring sleeved on the buffer section and accommodated in the receiving space, the spring being located between the guiding sliding set and the abutting gasket.

2. The joint floating fixed seat structure in claim 1, wherein the sliding element having an internal gasket sliding slot positioned correspondingly to the closed end of the fixed seat further comprises:
   an internal gasket sleeved on the buffer section and accommodated in the receiving space, and the internal gasket is slidably disposed in the internal gasket sliding slot.

3. The joint floating fixed seat structure in claim 2, wherein the buffer section comprises an external buffer section adjacent to the opening and an internal buffer section distant from the opening, the internal gasket, the abutting gasket and the spring are disposed on the internal buffer section, the guiding sliding set is disposed on the external buffer section, and a gap is formed between the sliding element and the internal gasket.

4. The joint floating fixed seat structure in claim 3, wherein an outer diameter of the external buffer section is greater than an outer diameter of the internal buffer section so that a step difference surface is formed between the external buffer section and the internal buffer section, and defining the internal gasket on the internal buffer section.

5. The joint floating fixed seat structure in claim 4, wherein a sliding abutting surface is disposed in the receiving space of the fixed seat, the sliding element sliding abuts against the sliding abutting surface, and the sliding abutting surface is not located at the same plane of the step difference surface.

6. The joint floating fixed seat structure in claim 1 further comprises:
   a sliding gasket sleeved on the sleeve section.

7. The joint floating fixed seat structure in claim 6, further comprises:
   a fixed element sleeved on the sleeve section, and the sliding gasket located between the fixed element and the closed end.

8. The joint floating fixed seat structure in claim 6 further comprises:
   an elastic element sleeved on the sleeve section and located between the sliding gasket and the closed end.

9. The joint floating fixed seat structure in claim 6, wherein the abutting gasket comprises a protruding portion extending through the through hole and abutting against the sliding gasket.

10. The joint floating fixed seat structure in claim 1, wherein the open end of the fixed seat is provided with a lower notch, the lower notch is connected to the opening and the receiving space, and the guiding seat further comprises:
   a guiding block extending via the lower notch and protruding out of the fixed seat, the guiding block having a guiding hole correspondingly inserted by a guiding post to guide movement of the adapter.

* * * * *